US009217753B2

(12) United States Patent
Molinari et al.

(10) Patent No.: US 9,217,753 B2
(45) Date of Patent: Dec. 22, 2015

(54) IMPACT AND SOUND ANALYSIS FOR GOLF EQUIPMENT

(71) Applicant: NIKE, Inc., Beaverton, OR (US)

(72) Inventors: Arthur Molinari, Beaverton, OR (US); Nicholas A. Leech, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 246 days.

(21) Appl. No.: 13/839,231

(22) Filed: Mar. 15, 2013

(65) Prior Publication Data

US 2014/0260637 A1 Sep. 18, 2014

(51) Int. Cl.
*G01H 1/06* (2006.01)
*G01N 3/30* (2006.01)
*G01C 19/00* (2013.01)
*A63B 37/00* (2006.01)
*G01H 1/00* (2006.01)
*G01H 3/08* (2006.01)
*G01P 3/12* (2006.01)

(52) U.S. Cl.
CPC .............. *G01P 9/00* (2013.01); *A63B 37/0003* (2013.01); *G01H 1/00* (2013.01); *G01H 3/08* (2013.01); *G01P 3/12* (2013.01)

(58) Field of Classification Search
CPC .... A63B 37/00; A63B 37/0003; A63B 37/06; A63B 69/3623; A63B 69/3658
USPC .................. 73/645, 11.1, 12.01, 12.02, 65.03; 473/221–227, 342–345, 372–376; 700/91–93; 702/33
See application file for complete search history.

(56) References Cited

U.S. PATENT DOCUMENTS

| | | | | |
|---|---|---|---|---|
| 5,562,285 A * | 10/1996 | Anfinsen et al. | ............... | 473/155 |
| 5,616,832 A * | 4/1997 | Nauck | ............. | 73/65.03 |
| 6,123,629 A * | 9/2000 | Yamaguchi et al. | .......... | 473/372 |
| 6,612,940 B1 * | 9/2003 | Nesbitt et al. | ................. | 473/376 |
| 8,758,169 B2 * | 6/2014 | Ichikawa et al. | ............... | 473/407 |
| 8,950,236 B2 * | 2/2015 | Ishii et al. | ...................... | 73/12.02 |
| 8,982,216 B2 * | 3/2015 | Ishii et al. | ...................... | 348/157 |
| 2004/0101812 A1 * | 5/2004 | Saegusa et al. | ............... | 434/252 |
| 2005/0197198 A1 * | 9/2005 | Otten et al. | .................... | 473/221 |
| 2005/0215340 A1 * | 9/2005 | Stites et al. | .................... | 473/233 |
| 2010/0130298 A1 * | 5/2010 | Dugan et al. | .................. | 473/223 |
| 2011/0230986 A1 * | 9/2011 | Lafortune et al. | ............... | 700/93 |
| 2012/0016565 A1 * | 1/2012 | Ide et al. | ........................ | 701/102 |
| 2012/0016599 A1 * | 1/2012 | Ishii | ................................ | 702/33 |
| 2012/0070009 A1 * | 3/2012 | Ishii et al. | ........................ | 381/56 |
| 2012/0322569 A1 * | 12/2012 | Cottam | ......................... | 473/223 |
| 2013/0017904 A1 * | 1/2013 | Woolley et al. | ............... | 473/342 |
| 2013/0113961 A1 * | 5/2013 | Ishii et al. | .................. | 348/231.3 |
| 2013/0184089 A1 * | 7/2013 | Rauchholz et al. | ........... | 473/168 |
| 2013/0190904 A1 * | 7/2013 | Kabeshita et al. | .............. | 700/91 |
| 2013/0260914 A1 * | 10/2013 | Ishii et al. | ...................... | 473/351 |

(Continued)

*Primary Examiner* — Helen Kwok
(74) *Attorney, Agent, or Firm* — Banner & Witcoff, Ltd.

(57) ABSTRACT

Golf performance and equipment characteristics may be determined by analyzing the impact between a golf ball and an impacting surface. In some examples, the impacting surface may be a golf club face. The impact between the golf ball and the surface may be measured based on sound and/or motion sensors (e.g., gyroscopes, accelerometers, etc.). Based on motion and/or sound data, various equipment-related information including golf ball compression, club head speed and impact location may be derived. Such information and/or other types of data may be conveyed to a user to help improve performance, aid in selecting golf equipment and/or to insure quality of golfing products.

21 Claims, 14 Drawing Sheets

(56) References Cited

U.S. PATENT DOCUMENTS

| | | | |
|---|---|---|---|
| 2014/0260635 A1* | 9/2014 | Leech | 73/645 |
| 2014/0260636 A1* | 9/2014 | Kammerer et al. | 73/646 |
| 2014/0278207 A1* | 9/2014 | Hadden et al. | 702/141 |

* cited by examiner

IMPACT AND SOUND ANALYSIS FOR GOLF EQUIPMENT

TECHNICAL FIELD

Aspects relate to analyzing impact data for golf equipment. More particularly, aspects described herein relate to determining various impact and equipment characteristics based on impact data.

BACKGROUND

Golf is enjoyed by a wide variety of players—players of different genders and dramatically different ages and/or skill levels. Golf is somewhat unique in the sporting world in that such diverse collections of players can play together in golf events, even in direct competition with one another (e.g., using handicapped scoring, different tee boxes, in team formats, etc.), and still enjoy the golf outing or competition. These factors, together with the increased availability of golf programming on television (e.g., golf tournaments, golf news, golf history, and/or other golf programming) and the rise of well known golf superstars, at least in part, have increased golf's popularity in recent years, both in the United States and across the world.

Golfers at all skill levels seek to improve their performance, lower their golf scores, and reach that next performance "level." Manufacturers of all types of golf equipment have responded to these demands, and in recent years, the industry has witnessed dramatic changes and improvements in golf equipment. For example, a wide range of different golf ball models now are available, with balls designed to complement specific swing speeds and/or other player characteristics or preferences, e.g., with some balls designed to fly farther and/or straighter; some designed to provide higher or flatter trajectories; some designed to provide more spin, control, and/or feel (particularly around the greens); some designed for faster or slower swing speeds; etc. A host of swing and/or teaching aids also are available on the market that promise to help lower one's golf scores.

Being the sole instrument that sets a golf ball in motion during play, golf clubs also have been the subject of much technological research and advancement in recent years. For example, the market has seen dramatic changes and improvements in putter designs, golf club head designs, shafts, and grips in recent years. Additionally, other technological advancements have been made in an effort to better match the various elements and/or characteristics of the golf club and characteristics of a golf ball to a particular user's swing features or characteristics (e.g., club fitting technology, ball launch angle measurement technology, ball spin rates, etc.).

Improvement in golf may also be achieved by studying a player's swing and adjusting his or her posture and swing characteristics to maximize momentum, head speed, lie angle, impact location and the like. However, it may be difficult for a user to independently to determine head speed or an impact location of the golf ball against the golf club face. While various technologies for detecting these characteristics exist, they may be costly or difficult to use.

BRIEF SUMMARY

The following presents a general summary of aspects of the disclosure in order to provide a basic understanding of the invention and various features of it. This summary is not intended to limit the scope of the invention in any way, but it simply provides a general overview and context for the more detailed description that follows.

Aspects described herein provide systems, methods, computer readable medium storing computer readable instructions for receiving data for an impact between a golf ball and an impact surface, analyzing the impact data to determine one or more characteristics of the impact, and generating an output based on the determined impact characteristic(s). The impact data may be received based on detecting a sound generated by the impact. The amplitudes and frequencies of the audio signal may be analyzed to determine various characteristics such as a magnitude of compression of the golf ball, an impact location on the surface and/or a speed with which the surface impacts the golf ball. In some examples, the surface may correspond to a surface of a golf club head. The determined characteristics may be used, in some arrangements, to determine a golf ball impact location on the surface of the golf club head. Alternatively or additionally, the characteristics may be used to identify a type of golf ball best suited for a particular user (and/or, e.g., golf club head speed). In yet other arrangements, the determined characteristics, such as golf ball compression, may be used to insure the quality of a golf ball.

According to some aspects, the impact data may include gyroscopic and/or accelerometric data of the golf club head. Using such data, the impact location may also be determined with or without the use of sound.

According to other aspects, a mobile communication device may be configured to detect golf ball impact sounds and to determine the various impact characteristics. In one example, a mobile communication device may record the sound of a golf ball impact and to visually indicate the golf ball impact location against a golf club head.

BRIEF DESCRIPTION OF THE DRAWINGS

A more complete understanding of the present invention and certain advantages thereof may be acquired by referring to the following detailed description in consideration with the accompanying drawings, in which.

Figure 1:
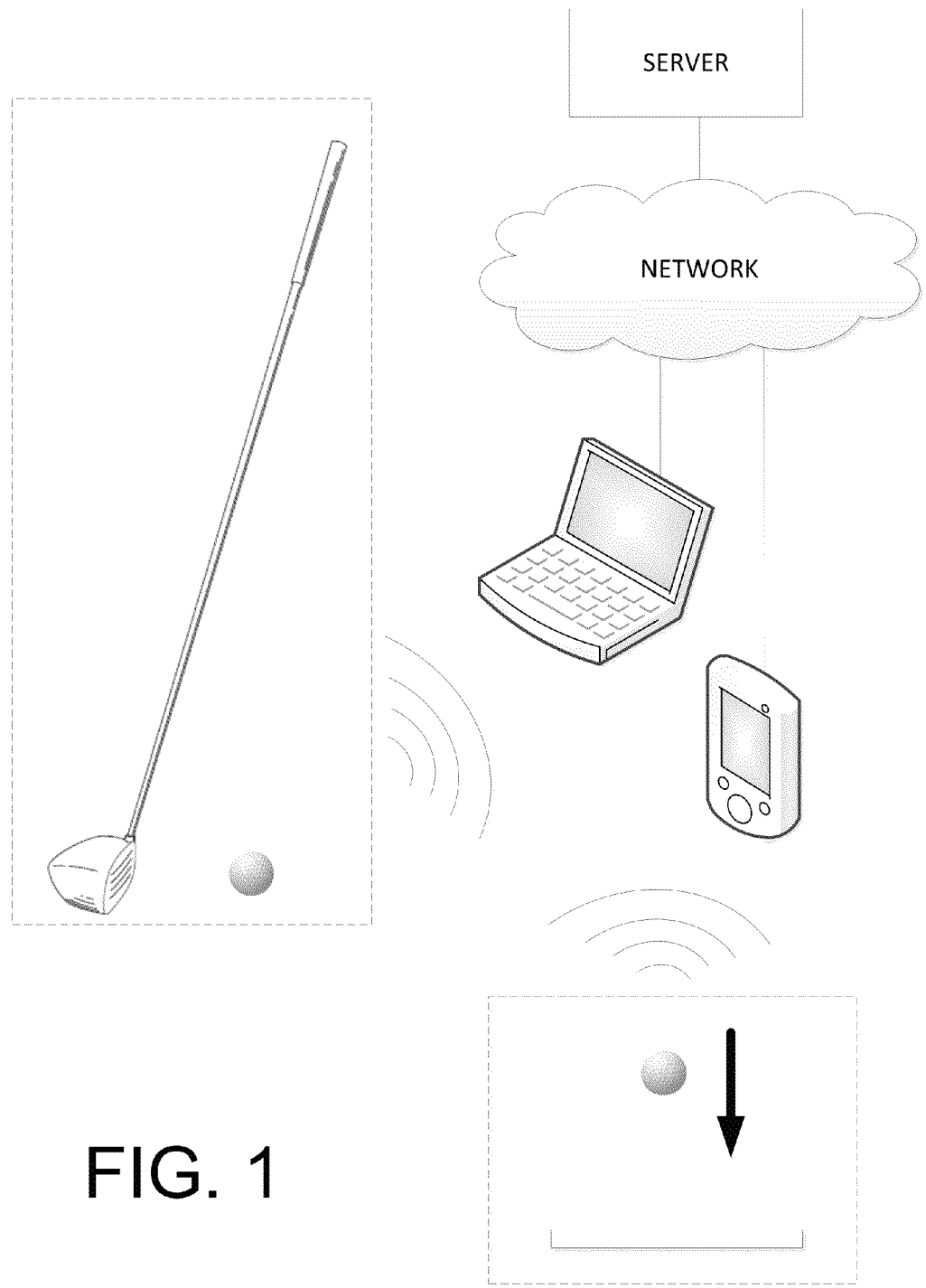
FIG. 1 illustrates an example golf analysis system according to one or more aspects described herein.

The reader is advised that the attached drawings are not necessarily drawn to scale.

DETAILED DESCRIPTION

In the following description of various example structures in accordance with the invention, reference is made to the accompanying drawings, which form a part hereof, and in which are shown by way of illustration various example connection assemblies, golf club heads, and golf club structures in accordance with the invention. Additionally, it is to be understood that other specific arrangements of parts and structures may be utilized, and structural and functional modifications may be made without departing from the scope of the present invention. Also, while the terms "top," "bottom," "front," "back," "rear," "side," "underside," "overhead," and the like may be used in this specification to describe various example features and elements of the invention, these terms are used herein as a matter of convenience, e.g., based on the example orientations shown in the figures and/or the orientations in typical use. Nothing in this specification should be construed as requiring a specific three dimensional or spatial orientation of structures in order to fall within the scope of this invention.

A. General Description of Background Information Relating to this Invention

Properly fitting a golfer with clubs and golf balls suited to his or her swing can help the golfer make better and more consistent contact with the ball during a swing and help the golfer reduce his or her score. Additionally, having additional information regarding how (e.g., where) a golfer is hitting a golf ball with a golf club may allow the golfer to better improve his or her swing. Several factors affect a golfer's swing. For example, the lie angle, the loft angle, type of golf ball, and the club head angle of the club during impact with a golf ball greatly affect the trajectory of the ball.

Various mechanisms exist to help a user evaluate his or her swing and, particularly, to identify an impact location on a club face. However, as noted above, such systems may be difficult or costly to use. For example, some systems require a user to place impact tape or paper on the golf club face. Upon hitting a golf ball, the user would then be able to identify the location where he or she made contact with the ball. Impact tape, as can be appreciated, must be replaced per use. Moreover, impact tape must be manually installed on the golf club each the user wishes to evaluate his or her swing and hit. As such, the efficiency and ease of using impact tape might detract from its adoption.

Other player swing analysis systems may involve the golfer visiting a specialized facility having high cost equipment for recording and/or measuring various characteristics of the player's swing. In one example, such systems are used to measure golf club head speed during a user's swing using motion or speed sensors for either the golf ball or the golf club head or both. Once the user's club head speed is known, the user may be fitted with appropriate balls for his or her head speed to help improve the player's performance. For example, some types of golf balls are designed for particular speed ranges, travelling farther for those particular speeds. Again, however, the cost of such an evaluation may be prohibitive to some players.

Accordingly, systems, methods, computer readable media storing computer readable instructions that will reduce the costs and improve the efficiencies of measuring various golf equipment and performance characteristics would be a welcome advance in the art.

B. General Description of Golf Ball Impact Analysis According to Examples of the Invention In general, as described above, aspects described herein relate to determining various golf equipment characteristics based on impact analysis. For example, using impact analysis, a system, method, computer readable media and the like may be able to determine club head speed, check the quality of a golf ball, determine an impact location between ball and club and the like.

FIG. 1 illustrates an example system and environment 100 in which various aspects described herein may be used and implemented. For example, characteristics of golf equipment may be determined using consumer electronic equipment including a personal computer 103 and mobile communication device 105. Mobile communication device 105 may comprise a tablet computer, a personal data assistant (PDA), a smartphone, and/or combinations thereof. Personal computer 103 may include laptop computers or desktop computers. Each of devices 103 and 105 may be connected to network 107 to a variety of other devices and destinations including server 109. Server 109 may be configured to collect data from various user devices as well as to distribute information such as fitness challenges, golf recommendations, product offers and the like. Devices 103 and 105 may include network interfaces that are either wired or wireless or may have both wired and wireless connection interfaces. Wireless connections may be short range or long range and may include Wi-Fi, BLUETOOTH, infrared, satellite communications, cellular communications and the like. Some devices (e.g., device 105) may include multiple network interfaces and have the capability of transmitting and receiving information over different interfaces depending on a destination/source, time of day, type of information being sent/received and the like. Components of devices 103 and 105 and server 109 are discussed in further detail below.

As noted, devices 103 and 105 may be equipped to detect various data from a golf ball impact and to determine various golf equipment characteristics therefrom. In one example, an impact sound signal may be used to determine (e.g., calculate) a variety of golf equipment characteristics, including impact location, club head speed, golf ball quality and the like. Accordingly, as shown with equipment arrangement 111, devices 103 and 105 may be configured to record a sound generated by the impact between club 113 and ball 115. As described in further detail below, the impact sound signal may provide various frequencies indicative of the location of the impact location and/or the golf club speed at impact. Each of devices 103 and 105 may have an application or program to evaluate the sound data and to provide various output including club speed, impact location and product recommendations.

Equipment arrangement 117 illustrates a quality check system for golf balls. The golf balls may be launched, dropped or otherwise released so as to impact a surface and generate an impact sound. This sound may indicate an amount of compression experienced by the golf ball upon impact. For example, since golf balls are required to have a certain range of compression with a given force, the acceptability of the golf ball may be verified based on the sound of the golf ball impact. As will be described in further detail, the ball may be launched, dropped or released from a known distance or height so that the test force is known and consistent during each test, and the resulting impact sound recorded. In one example, each golf ball may be released from a height of 5 feet. Other heights and distances may be used depending on various factors. The amount of compression may then be calculated based on the recorded sound.

According to yet other aspects, the golf club 113 may include one or more non-acoustic sensors such as gyroscopes and/or accelerometers. Gyroscopes may provide data indicating the angular velocity about a particular axis. In one arrangement, club 113 may include three gyroscopes for measuring angular velocity about the x, y and z-axes. These angular velocities may also provide an indication of the impact location. For example, and similar to the analysis of sound signals, the gyroscopic signals from the golf club 113 may be analyzed to determine the frequency content. The energy associated with specific frequencies may then be evaluated against previously determined angular velocity characteristics (e.g., in the form of frequency response spectra such as Fast Fourier Transforms, also known as FFTs) in determining a location on the club 113 face where the golf ball 115 impacted. A similar process may be implemented using measured club accelerations. This analysis may be performed by club 113, device 103, device 105, server 109 and/or a combination thereof.

Figure 2:
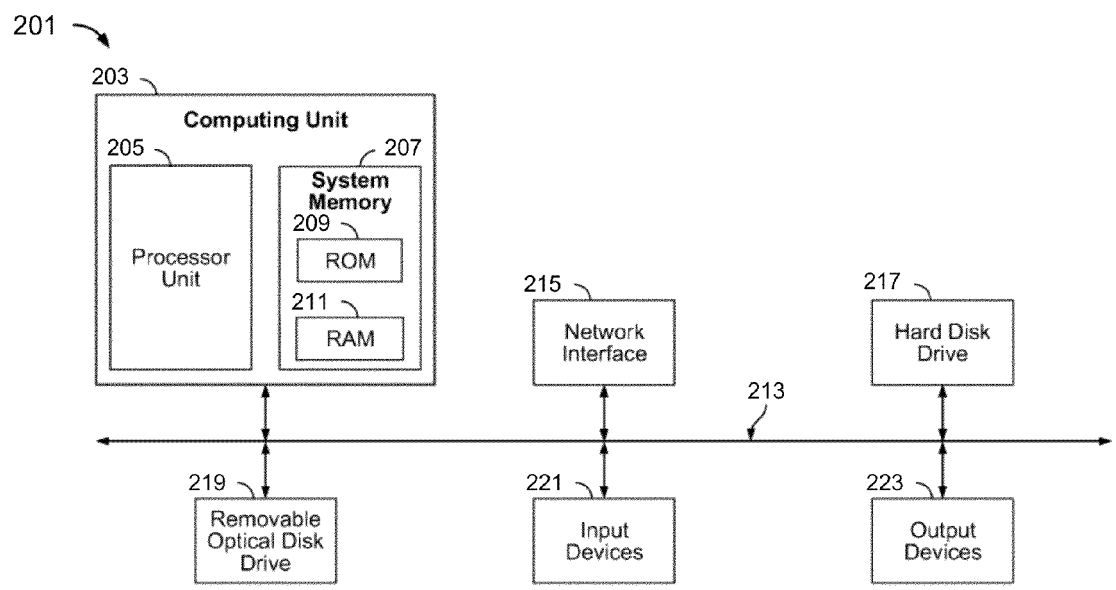
FIG. 2 illustrates an example computing device according to one or more aspects described herein.

FIG. 2 shows one illustrative example of a computing device 201 that can be used to implement various aspects and features described herein. For example, computing device 201 may act as device 103, device 105, server 109 and/or a computing module within club 113 or ball 115. As seen in this figure, the computing device 201 has a computing unit 203. The computing unit 203 typically includes a processing unit 205 and a system memory 207. The processing unit 205 may be any type of processing device for executing software instructions, but will conventionally be a microprocessor device. The system memory 207 may include both a read-only memory (ROM) 209 and a random access memory (RAM) 211. As will be appreciated by those of ordinary skill in the art, both the read-only memory (ROM) 209 and the random access memory (RAM) 211 may store software instructions for execution by the processing unit 205.

The processing unit 205 and the system memory 207 are connected, either directly or indirectly, through a bus 213 or alternate communication structure to one or more peripheral devices. For example, the processing unit 205 or the system memory 207 may be directly or indirectly connected to additional memory storage, such as the hard disk drive 217, the removable optical disk drive 219. Additional buses may be included as needed or desired. Computing device 201 may further use or interface with other memory storage mediums such as solid state drives, removable magnetic disk drives and flash memory cards. The processing unit 205 and the system memory 207 also may be directly or indirectly connected to one or more input devices 221 and one or more output devices 223. The input devices 221 may include, for example, a keyboard, touch screen, a remote control pad, a pointing device (such as a mouse, touchpad, stylus, trackball, or joystick), a scanner, a camera or a microphone. The output devices 223 may include, for example, a monitor display, television, printer, stereo, or speakers.

Still further, the computing unit 203 may be directly or indirectly connected to one or more network interfaces 215 for communicating with a network. This type of network interface 215, also sometimes referred to as a network adapter or network interface card (NIC), translates data and control signals from the computing unit 203 into network messages according to one or more communication protocols, such as the Transmission Control Protocol (TCP), the Internet Protocol (IP), and the User Datagram Protocol (UDP). Network adapters may be wireless or wired or combinations thereof. These protocols are well known in the art, and thus will not be discussed here in more detail. An interface 215 may employ any suitable connection agent for connecting to a network, including, for example, a wireless transceiver, a power line adapter, a modem, or an Ethernet connection. Connection agents may similarly be wireless or wired or a combination thereof. Accordingly, using interface 215, computing device 201 may be able to access wide area networks such as the Internet in addition to local area networks. Data such as sound signals, calculated impact location information, golf ball quality information, club head speed data and the like may be transmitted to or received from local or remote network sources (not shown).

It should be appreciated that, in addition to the input, output and storage peripheral devices specifically listed above, the computing device may be connected to a variety of other peripheral devices, including some that may perform input, output and storage functions, or some combination thereof. For example, the computing device 201 may be connected to a digital music player, such as an IPOD® brand digital music player available from Apple, Inc. of Cupertino, Calif. As known in the art, this type of digital music player can server as both an output device for a computer (e.g., outputting music from a sound file or pictures from an image file) and a storage device. In addition, this type of digital music player also can serve as an input device for inputting recorded athletic information such as golf swing information. Connections and interfaces may be wireless, wired or combinations thereof In addition to a digital music player, the computing device 201 may be connected to or otherwise include one or more other peripheral devices, such as a telephone. The telephone may be, for example, a wireless "smartphone." As known in the art, this type of telephone communicates through a wireless network using radio frequency transmissions. In addition to simple communication functionality, a "smart phone" may also provide a user with one or more data management functions, such as sending, receiving and viewing electronic messages (e.g., electronic mail messages, SMS text messages, etc.), recording or playing back sound files, recording or playing back image files (e.g., still picture or moving video image files), viewing and editing files with text (e.g., Microsoft Word or Excel files, or Adobe Acrobat files), etc. Because of the data management capability of this type of telephone, a user may connect the telephone with the computing device 201 so that their data maintained may be synchronized.

Of course, still other peripheral devices may be included with or otherwise connected to a computing device 201 of the type illustrated in FIG. 2, as is well known in the art. In some cases, a peripheral device may be permanently or semi-permanently connected to the computing unit 203. For example, with many computers, the computing unit 203, the hard disk drive 117, the removable optical disk drive 219 and a display are semi-permanently encased in a single housing. Still other peripheral devices may be removably connected to the computing device 201, however. The computing device 201 may include, for example, one or more communication ports through which a peripheral device can be connected to the computing unit 203 (either directly or indirectly through the bus 213). These communication ports may thus include a parallel bus port or a serial bus port, such as a serial bus port using the Universal Serial Bus (USB) standard or the IEEE 1394 High Speed Serial Bus standard (e.g., a Firewire port). Alternately or additionally, the computer 101 may include a wireless data "port," such as a Bluetooth interface, a Wi-Fi interface, an infrared data port, or the like.

It should be appreciated that a computing device employed according various examples of the invention may include more components than the computing device 201 illustrated in FIG. 2, fewer components than the computing device 201, or a different combination of components than the computing device 201. Some implementations of the invention, for example, may employ one or more computing devices that are intended to have a very specific functionality, such as a digital music player or server computer. These computing devices may thus omit unnecessary peripherals, such as the network interface 215, removable optical disk drive 219, printers, scanners, external hard drives, etc. Some implementations of the invention may alternately or additionally employ computing devices that are intended to be capable of a wide variety of functions, such as a desktop or laptop personal computer. These computing devices may have any combination of peripheral devices or additional components as desired.

A computing device such as device 201 may be used to calculate or otherwise determine swing characteristics including an impact location between a golf ball and a golf club, an amount of compression experienced by a dropped golf ball and/or a head speed of a golf club during a player's swing. In some arrangements, these calculations or determinations may be based on sound that is detected through, for example, a microphone.

Figure 3:
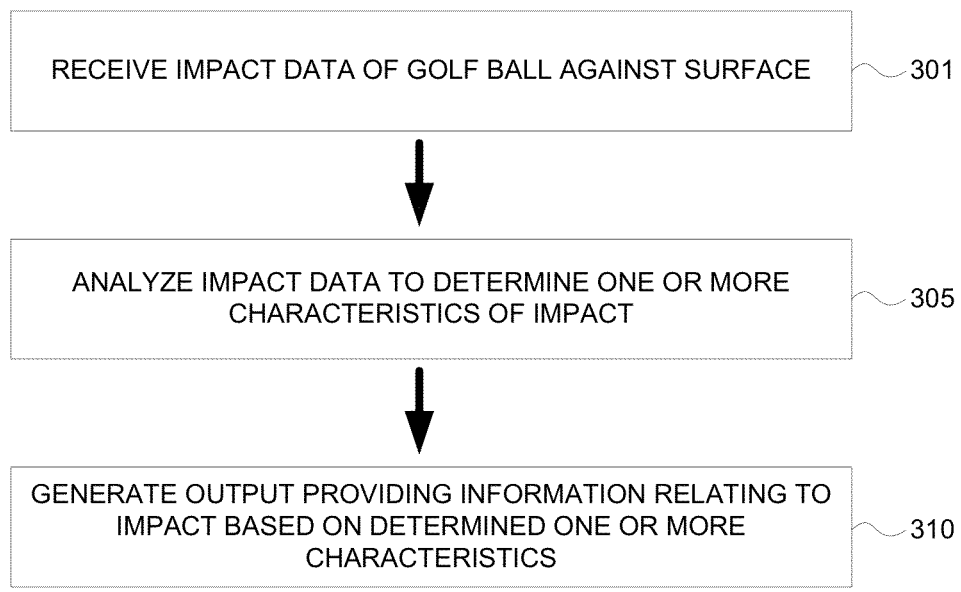
FIG. 3 illustrates an example process by which a golf ball impact may be analyzed to determine one or more performance characteristics according to one or more aspects described herein.

FIG. 3 illustrates an example method by which information relating to golf equipment may be generated as output based on golf ball impact detection. In step 301, a computing device (e.g., device 201 of FIG. 2) may receive impact data. As noted herein, impact data may include a variety of information including detected sound, data from sensors on a golf club or golf ball (or both), data from a sensor external to the golf equipment and the like and/or combinations thereof. The data may be recorded, in some examples, by a device such as laptop 103 or mobile communication device 105 (both of FIG. 1). Additionally or alternatively, the user may be prompted to create the golf ball impact by an instruction from the computing device. As such, a user might only begin swinging at the golf ball upon receiving a corresponding instruction from the computing device.

In step 305, the computing device may further analyze the received impact data by performing various calculations, comparisons, mathematical functions and the like. In one example, a recorded sound signal may be processed using a Fourier Transform to determine the response frequencies and the amplitudes at each frequency. Alternatively or additionally, the computing device may compare the impact data or other data derived from the analysis of the impact data to determine various attributes or characteristics of the impact.

In step 310, the computing device may generate an output based on the analysis of the impact data. The output may include visuals, audio data, textual information and/or haptic feedback. According to one aspect, the output may include an indication of an impact location. According to another aspect, the output may include an indication as to whether a golf ball passed a quality control check. According to yet another aspect, the output may include a club head speed and/or a recommendation for a type of golf ball to use. As one might imagine, a variety of other types of output and information may be provided to a user based on the analysis of the impact data.

1. Example Golf Club Head Speed Determination and Golf Ball Fitting

Golf club head speed may be important in evaluating a player's swing and performance. For example, the faster a player's club head speed, the farther a ball may potentially fly. In some instances, however, a golf ball may be configured to particular head speeds. Accordingly, a golf ball configured for a higher head speed might not fly as far as one that is configured for the particular head speed with which a player is able to achieve. In order to identify the correct golf ball for the player, the club head speed must first be determined.

Figure 4:
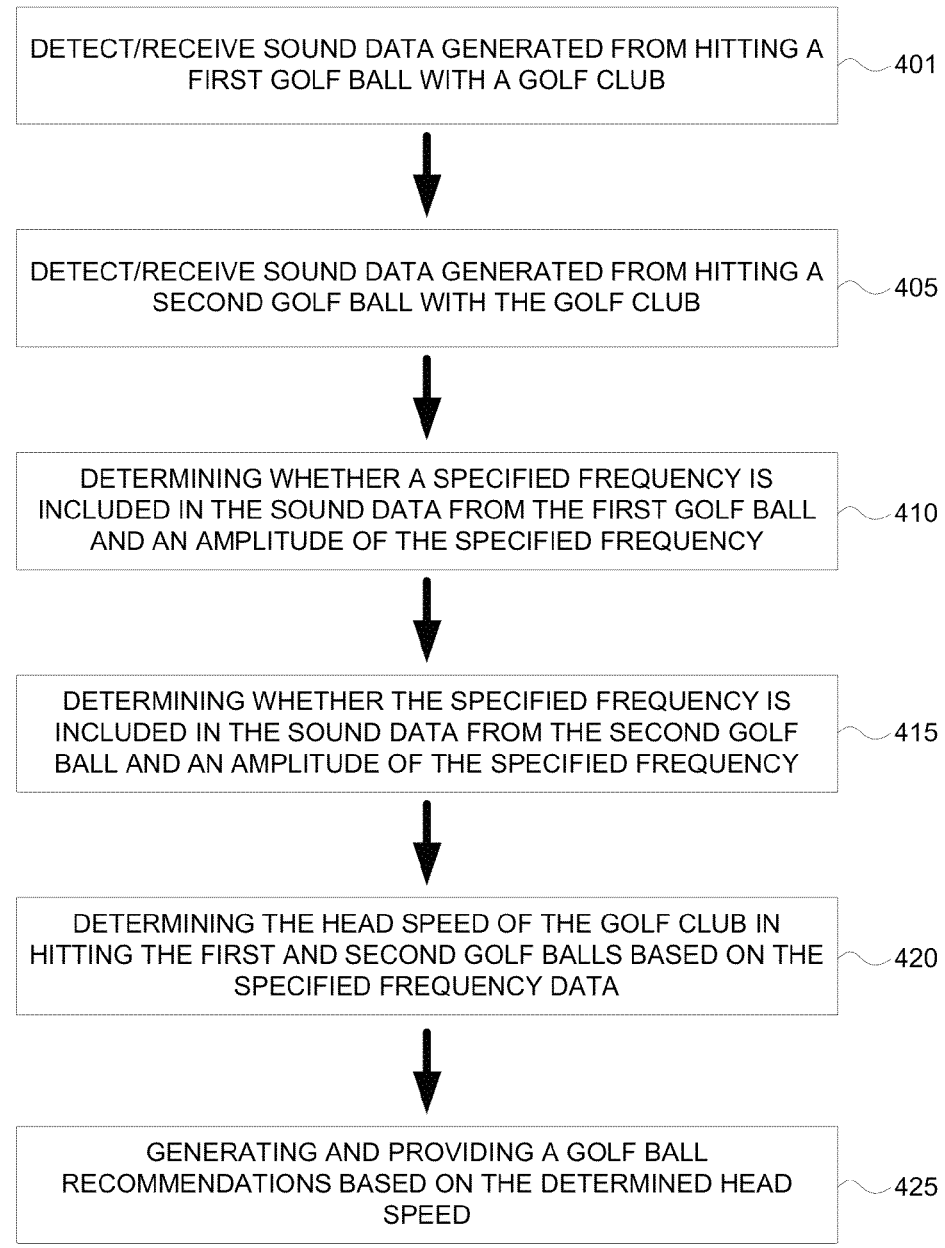
FIG. 4 illustrates an example process for determining a club head speed using sound analysis according to one or more aspects described herein.

FIG. 4 illustrates an example method for determining club head speed without use of a motion sensor (e.g., speed gun). The method may include the use of multiple golf balls, each exhibiting different constructions and sound characteristics than the others. In one example, a computing system (e.g., computing device 201 of FIG. 2) may initially detect/receive sound data generated from hitting a first golf ball using a golf club in step 401. The first golf ball may include a first set of characteristics that cause the golf ball impact to generate a sound signal having a predefined frequency when struck at a particular head speed. In one example, the computing device may record the sound using its own microphone. In another example, the computing device may receive a sound signal recorded by another device such as the golf club, a stand-alone microphone, a mobile communication device (e.g., the player's mobile phone) or the like. The computing system may further detect/receive sound data generated from hitting a second golf ball using the golf club in step 405. The second golf ball may differ from the first golf ball in one or more characteristics such as material composition, compression, hardness and the like. As with the first ball, the second golf ball may be configured to generate a sound signal having the predefined frequency when struck at another particular head speed (e.g., lower than the particular head speed of the first golf ball).

Figure 5:
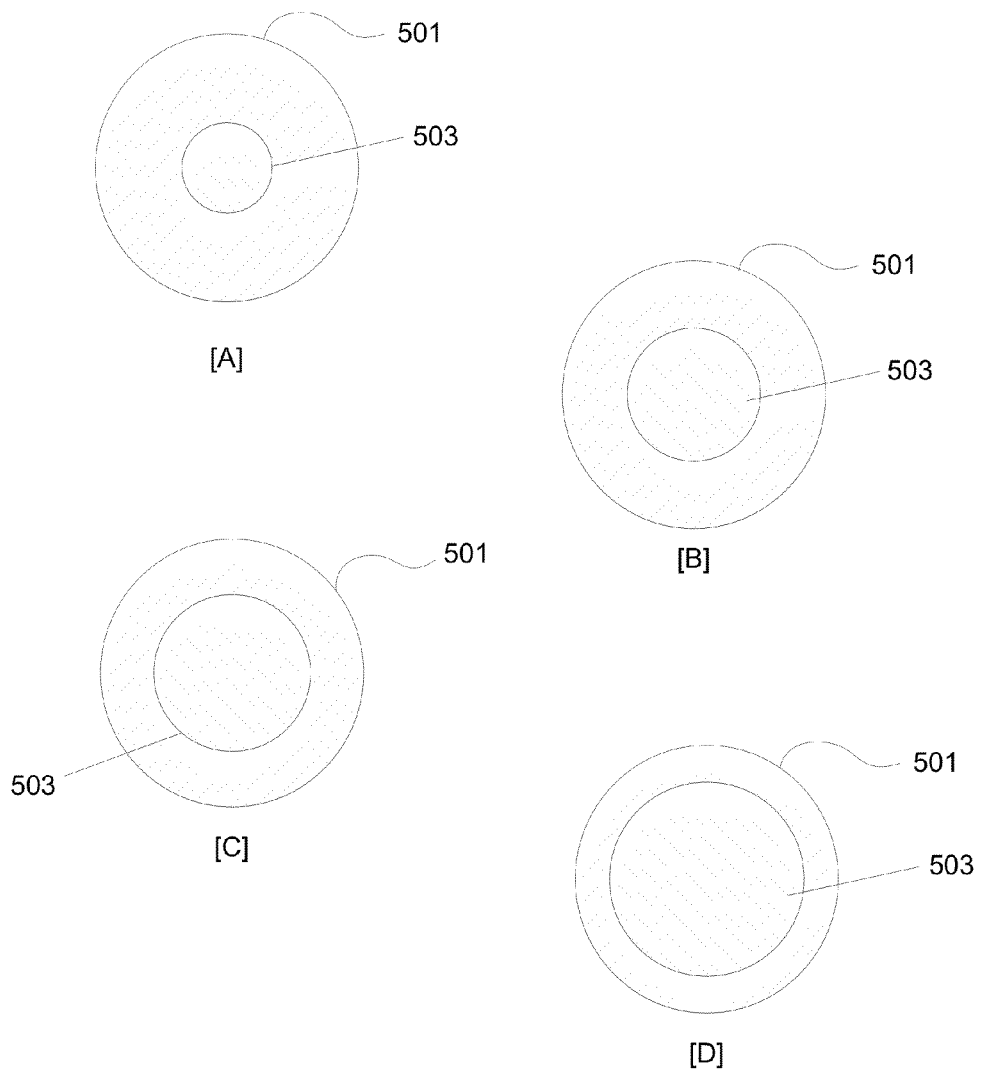
FIG. 5 illustrates example golf balls that may be used to determine golf club head speed according to one or more aspects described herein.

FIG. 5 illustrates example golf balls that may be used in determining the head speed of the player's club. Balls [A], [B], [C] and [D] may be characterized in having cores of different sizes. The cores may be configured to produce a sound frequency different from frequencies that are otherwise generated if the core is not sufficiently impacted by the club. In one example, the outer portion 501 of each ball may be composed of a rubber material while the inner core 503 of each ball may be composed of a resin material (e.g., HPF core). The relative sizes of the inner cores 503 allow for easier or more difficult activation of the specified frequency. For example, the larger inner core 503 as shown in golf ball [D] may activate at lower club head speeds (e.g., lower compression), while the smaller inner core 503 of golf ball [A] may require a high club head speed (e.g., higher compression) to trigger the specified frequency. In some arrangements, the specified frequency might always be generated when any of the golf balls [A]-[D] are struck. However, the frequency might not be perceptible or extracted from the sound signal unless the frequency is of a minimum amplitude. Accordingly, the balls may be rated for different club speeds corresponding to the speed and compression required to generate the frequency at the minimum amplitude.

The golf balls used for club speed testing and golf ball fitting may be configured as a set to be used with one another. For example, golf ball [A] may be rated for a first speed, while golf balls [B], [C] and [D] may be rated for second, third and fourth speeds, respectively, where the first speed>second speed>third speed>fourth speed. Using this preconfigured set of golf balls, the user's golf club head speed may be appropriately determined based on detection of the specified frequency.

Golf balls [A]-[D] may be configured in other ways to achieve the same ability to differently generate the specified frequency depending on club head speed. In one example, the golf club outer core 501 may be constructed using different materials having different compression characteristics. Accordingly, the inner core 503 of the balls, in various examples, may be identical or substantially the same while the outer core 501 may be configured to control the amount of force and club head speed required to trigger the predefined frequency. Other configurations may also be used to distinguish the sound-generating characteristics of the golf balls.

Referring again to FIG. 4, the computing system may determine, in steps 410 and 415, whether the specified frequency exists in the received sound signals of steps 401 and 405, respectively. The specified frequency may be determined empirically based on a population of sample hits of varying speeds. In one example, a club swinging machine may be used to record sound signals at a variety of different speeds and using the various golf balls. The frequency characteristics of each of the sound signals for each of the golf balls may be analyzed to identify the frequency generated by the inner core (for instance). Based on the frequency information, the computing system may determine a club head speed in step 420. For example, if the specified frequency is detected from the second golf ball hit, but not the first golf ball hit, the computing system may determine that the club head speed is lower than a minimum rated club head speed of the first golf ball, but not as low as the rated club head speed of the second golf ball. The computing system may further compare the amplitude of the specified frequency to determine the corresponding club speed based on known (e.g., predefined) amplitude-club head speed relationships. For example, the specified frequency registering at a first amplitude may correspond to a club speed of 90 mph while the specified registering at a second amplitude may correspond to a club speed of 102 mph. Speeds and amplitudes between the predefined relationship may be interpolated. Such predefined relationships may be generated based on the empirical data gathered in the sample hits. Alternatively, if the specified frequency is detected in both the first golf ball hit and the second golf ball hit, the computing system may determine that the club head speed is at least greater than the minimum rated club speed of the first golf ball.

As noted above, in some arrangements, the computing system may consider the amplitude of the frequencies in determining whether a particular frequency exists in a sound signal. Accordingly, if the specified frequency in a sound signal does not register a minimum amplitude, the computing system may determine that the specified frequency was not detected or does not exist in the sound signal. In some examples, the minimum amplitude may be defined based on an intensity of ambient noise in the environment. The ambient noise may be measured prior to the golf ball hits to set the baseline minimum for the specified frequency.

In step 425, the computing system may further generate and provide a golf ball recommendation based on the determined club head speed. As discussed, different golf balls may have difficult constructions and configurations to achieve maximum distance for a given club head speed. Accordingly, a table or other relationship may be predefined to correlate club head speed with particular types of golf balls. Thus, upon determining the user's club head speed, the computing system may recommend a corresponding type of golf ball. Other factors beyond club head speed may also be taken into account in generating the recommendation including club type, lie angle, gender of the player and the like.

While the arrangements described above with respect to FIG. 4 illustrates the first and second ball hits being recorded prior to analyzing the sound signals, other sequences may be adopted. For example, the first ball hit may be performed followed by the analysis of whether the specified frequency is included in the first ball hit. Only if the specified frequency does not exist (or is below a specified minimum amplitude) might the computing system instruct the user to proceed to hit the second golf ball. Additionally or alternatively, more than two golf balls may be used in the club head speed determination process. For example, a total of 3, 4, 5, 7, 10, etc. golf balls may be used to detect club head speed. The use of more golf balls may, in some examples, provide more golf club speed detection granularity.

According to still other arrangements, a user may be instructed to start with a golf ball having a lowest rated club head speed and to hit additional golf balls if the specified frequency is detected and/or is above a maximum amplitude threshold. For example, if the specified frequency is detected, but exceeds a threshold amplitude, the computing system might not be able to determine the corresponding club head speed. The computing system might, in some arrangements, only define club head speed to amplitude correspondences up to a certain threshold amplitude. Accordingly, the user may be instructed to hit a second golf ball having a higher rated club head speed to better determine the club head speed.

Using sound, a player's golf club head speed may be determined using typical consumer electronics. The golf club head speed may then be used to select an appropriate golf ball to maximize the player's performance.

2. Example Impact Location Determination Using Sound

In addition to golf club head speed, sound may be used to determine a location on a club face where a golf ball makes contact. As can be appreciated by golfers, knowing and improving upon a contact location between the club and the ball may help significantly improve golfing performance. For example, a player may better adjust his or her stance, posture, grip and the like to achieve hitting the golf ball in the "sweet spot" of the club face.

Figure 6:
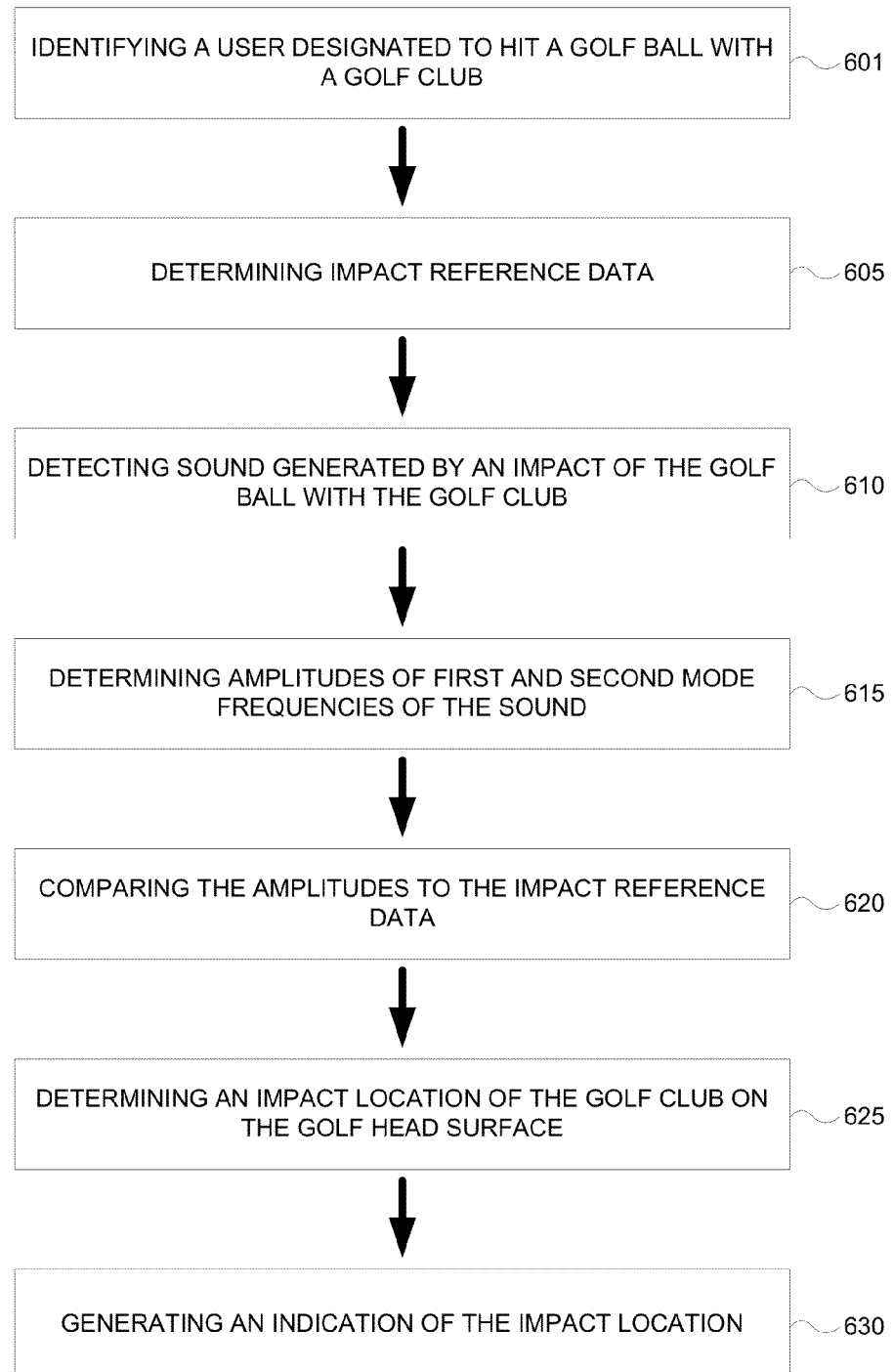
FIG. 6 illustrates an example process for determining impact location based on impact sound analysis according to one or more aspects described herein.

FIG. 6 illustrates an example method by which a computing system may determine an impact location of a golf ball on a golf club face. The computing system may correspond to a mobile communication device in some examples. In step 601, the computing system may request identification of a user that will be hitting golf balls. The identification of the user may be used to determine impact location reference data. For example, each user may register different frequencies when hitting a golf ball with a golf club. Accordingly, a first person's swing and hit might only be accurately comparable to his or her own reference data. Additionally or alternatively, identification of the user may also allow the computing system to load pre-stored user information including name, hitting records, score records, equipment records and the like. The user's equipment records may allow the user to identify a particular club or type of club he or she is using. The type of golf club and the type of golf ball used may affect the impact location determination reference data. For example, different types of club (e.g., model, construction, etc.) may generate different sound frequencies when being hit in different locations on its face. A driver may produce a different sound signature than a fairway wood, for instance. Accordingly, such club and ball information may also provide additional parameters by which the impact location may be evaluated and determined.

In step 605, the computing system may determine the impact location reference data. As described above, the impact location reference data may be retrieved and/or defined based on a variety of factors including user identification, golf club type (e.g., make model, composition), golf ball type (e.g., make, model, composition) and the like and/or combinations thereof. For example, a different set of reference data may be defined for each combination of golf club type and golf ball type (and/or other factors). Accordingly, the computing system may further request input of the golf club type and/or golf ball type. In some examples, the golf club type and/or the golf ball type may be automatically determined (e.g., based on wireless communication with the golf club and/or golf ball) or based on user input. The reference data may be pre-loaded into the computing system. In some examples, the user may be asked to hit multiple golf balls and to self-identify the impact location to generate the reference data. In some examples, a single user may be associated with multiple sets of reference data, e.g., one set for each type of golf club used. Additionally or alternatively, reference data may be retrieved through a network and/or from other devices. Thus, if a user does not have reference data predefined for a specific type of golf club, the user may obtain reference data for other users that have used the specific type of golf club. Although reference data from other users might not provide the most accurate results, the reference data may provide sufficiently accurate impact location determinations given the circumstances. In some cases, impact location determination results from the use of reference data from other users might provide may be as accurate as results from the use of the user's own reference data.

Reference data may also be selected/retrieved using other factors in addition to the type of golf club. For example, a user's gender, height, weight, location, handicap and the like may also be used as reference data selection factors. Reference data may be stored in the cloud (e.g., on a network server) or may be stored locally on a user's device. In other examples, reference data may be passed between local devices using short-range wired and wireless connections.

In step 610, the computing system may detect a sound generated by the impact of the golf ball with the face of the golf club. The computing system may further record the sound. In some arrangements, the computing system may be configured to provide instructions to the user to indicate when to begin a shot. Using such instructions, the computing system may better time when to begin recording and when the stop. Alternatively or additionally, a user may manually indicate when a shot is to begin and when it has been completed.

In step 615, the computing system may process the sound signal using a mathematical function such as an FFT. The FFT may be used to decompose a signal into its component frequencies. For example, using FFT on the recorded sound signal, the computing system may determine the first and second mode frequencies. In step 615, the computing system may also determine the amplitudes of the first and second mode frequencies. Subsequently, in step 620, the determined first and second mode frequency amplitudes may be compared to the reference data to determine a location of impact.

Figure 7:
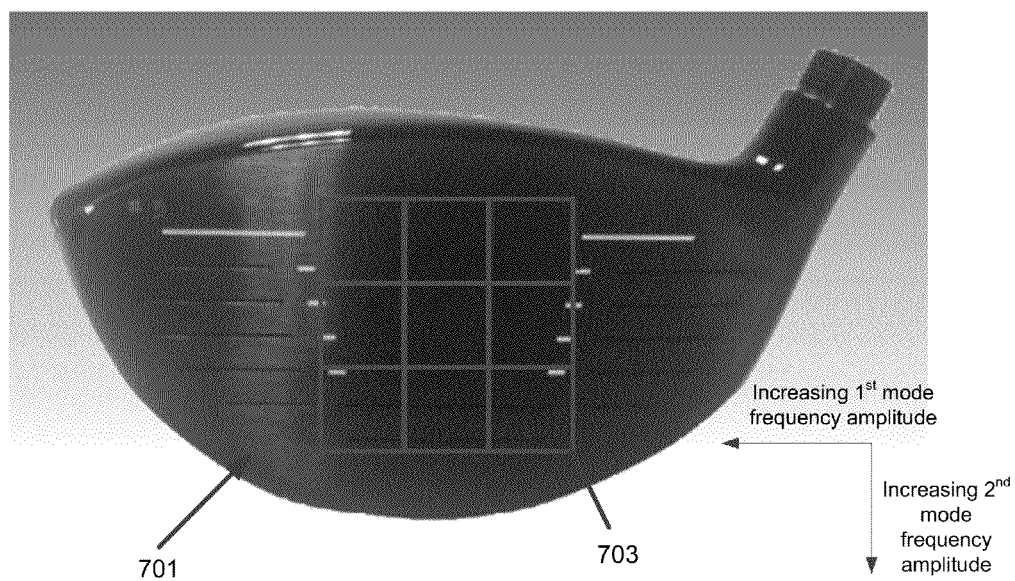
FIG. 7 illustrates an example division of impact location areas on a club face according to one or more aspects described herein.

FIG. 7 illustrates an example grid 703 dividing an area of the golf club face 701. The grid 703 divides the area of face 701 into nine regions and represents the level of granularity with which the impact location may be specified. Accordingly, each hit may be categorized into one of these nine regions. The reference data may specify a range of amplitudes for the first and second mode frequencies for each of the nine regions. In one example, and as illustrated in FIG. 7, the amplitudes of the first mode frequency may increase from heel to toe while the amplitudes of the second mode frequency may increase from top to bottom. Empirical tests showed that the first and second mode frequencies of the impact sound are indicative of the area in which contact was made. Based on the correlations between location and the amplitudes of the first and second mode frequencies from the empirical tests, the reference data may be appropriately constructed and mapped. Additional or fewer regions on the golf club face 701 may be defined based on needs and reference data availability. For example, additional empirical studies may be performed to identify the ranges of first and second mode frequencies that would result from hits closer to the toe and/or heel.

In step 625, the computing system may determine an impact location of the shot based on the reference data and the determined first and second mode frequencies. That is, in one example, the amplitude of the first mode frequency may be compared to a reference range of amplitudes for first mode frequencies and the amplitude of the second mode frequency may be compared to a reference range of amplitudes for the second mode frequency. The result of the comparison is configured to map the first and second mode frequencies to the corresponding impact location. Once the impact location has been determined, the computing system may further display a visual indication to the user in step 630.

Figure 8:
FIG. 8 illustrates an example interface for displaying an impact location according to one or more aspects described herein.

FIG. 8 illustrates an example user interface illustrating an impact location indicator. In some examples, selecting the indicator 801 in the user interface may cause the computing system to display additional statistics and information about the shot. For example, the additional information may include a club head speed, a type of club used, a distance the ball travelled and the like. Additionally or alternatively, the computing system may also be configured to provide historical data for all shots that had the same impact location. The display of historical data may indicate historical averages when the user has shot the ball using that impact location. The computing system may further provide statistics regarding a number of shots made using that impact location versus other impact locations. According to one or more aspects, the impact location indicator may be color-coded to represent various other information including a club head speed and a frequency with which the player or a community of players hit a golf ball at that impact location.

The impact location data and other shot data may be sent through a network to a remote golf data tracking system for storage. Alternatively or additionally, the shot data may be stored to the mobile communication device. In some examples, the user may be prompted to store the data to a network site, locally, or to delete the data. Shot information may be stored according to date, location, golf event, player and the like and/or combinations thereof.

In some arrangements, the impact sound may be used to determine both golf club head speed as well as an impact location. Accordingly, an application executing on a mobile communication device may be equipped to provide a variety of golf shot data to a user based on the sound generated by the impact. Such an application and mobile communication device offers a convenient and cost-effective way to analyze golf shot information.

The impact location may also be used to determine a player's consistency in hitting a golf ball. For example, a user may track whether he or she consistently hits a golf ball at a particular area of the golf club. Alternatively, the consistency information may indicate that the user misses a central area of the golf club, but that the impact location is inconsistent outside of the central area. Such consistency (or inconsistency) information may be useful in golf ball fitting/selection.

For example, one type of ball may be better for a golfer that consistently misses at one (or two) areas of the face, whereas another ball may be better if the particular player's misses are spread around the golf club face. For example, if a golfer's misses (missing the predefined best area of the golf club face) are spread among a threshold number of impact areas or locations, a recommendation system may recommend a first type of ball. On the other hand, if the golfer's misses are located within one or two areas of the club head, then a second type of ball may be recommended. Consistency or inconsistency may be measured by a predefined threshold percentage or number of shots. Accordingly, if 90% or 95% (or other percentage) of the golfer's shots are within a predefined area (or two predefined areas), a system may determine that the golfer's shots are consistently within that predefined area (or areas). The threshold may be user-defined or may be set based on various factors such as gender, player experience, handicap and the like.

3. Example Impact Location Determination Using Motion Sensors

In addition to sound, various motion data may be detected and used to evaluate golf shot characteristics. For example, while FIGS. 6-8 describe the use of sound to identify an impact location, motion data detected using accelerometers and/or gyroscopes may also be used to determine such shot characteristics.

Figure 9:
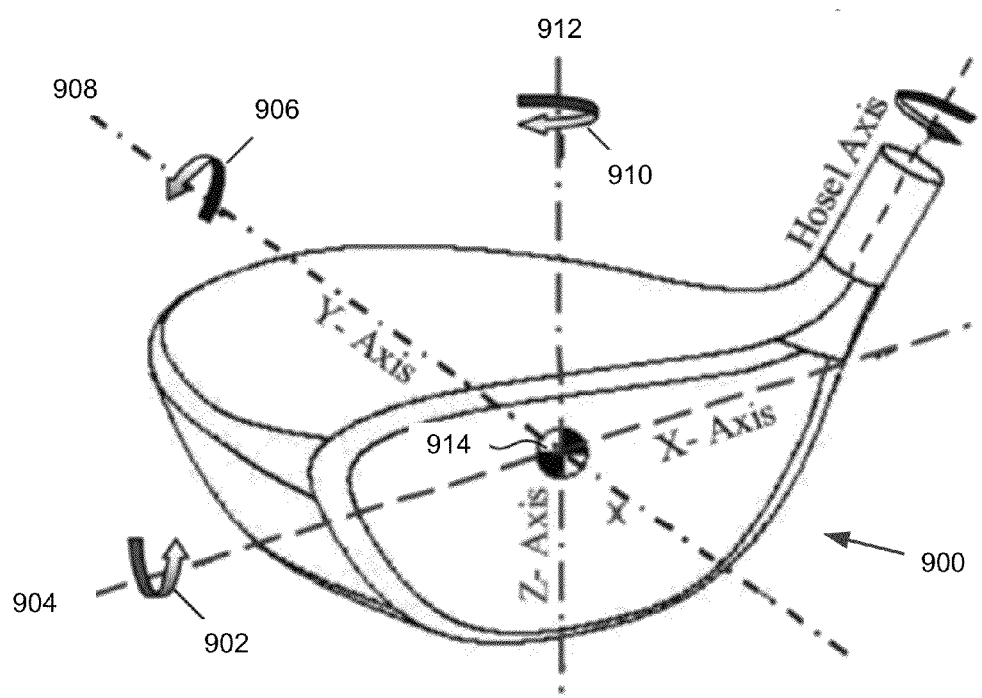
FIG. 9 illustrates an example process for determining impact location using motion sensor data according to one or more aspects described herein.

FIG. 9 shows exemplary golf club head 900 that may be configured to comprise three (3) gyroscopes. In one embodiment, a first gyroscope is configured to measure an angular velocity (i.e., see arrow 902) along the x-axis 904, a second gyroscope is configured to measure an angular velocity (i.e., see arrow 906) along the y-axis 908, and a third gyroscope is configured to measure an angular velocity (i.e., see arrow 910) along the z-axis 912. In one embodiment, the first gyroscope may be positioned at around position 914 (about the center of the face along the x-axis 904). In yet another embodiment, the second and/or third gyroscope may also be located substantially at or around position 914. In yet another embodiment, one or more of the gyroscopes are along the center of gravity of the x-axis 904. Yet in another embodiment, one or more of the gyroscopes may be positioned slightly below the center of gravity. Yet in another embodiment, one or more of the gyroscopes may be positioned inside the club shaft in the areas where the grip is attached.

Using measurements from a plurality of gyroscopes along multiple axes (for example, axes 902, 906, and 910) with knowledge of the position of the club just prior to the beginning of the swing (i.e., the "initial position"), it is possible to calculate the angular orientation of the club face at any point in the swing up to, and if desired, past the impact with the ball. Such methods and systems are described in U.S. Pat. No. 8,257,191, entitled "Golf Clubs and Golf Club Heads Having Digital Line and/or Other Angle Measuring Equipment," and issued Sep. 4, 2012. The content of this patent is incorporated by reference in its entirety.

In addition to angular orientation of the club face, the gyroscopes of club head 900 may also provide sensor data that may be used to determine an impact location of a golf shot. The sensor data from the gyroscopes may be used in place or in addition to the sound impact location analysis described above.

Figure 10:
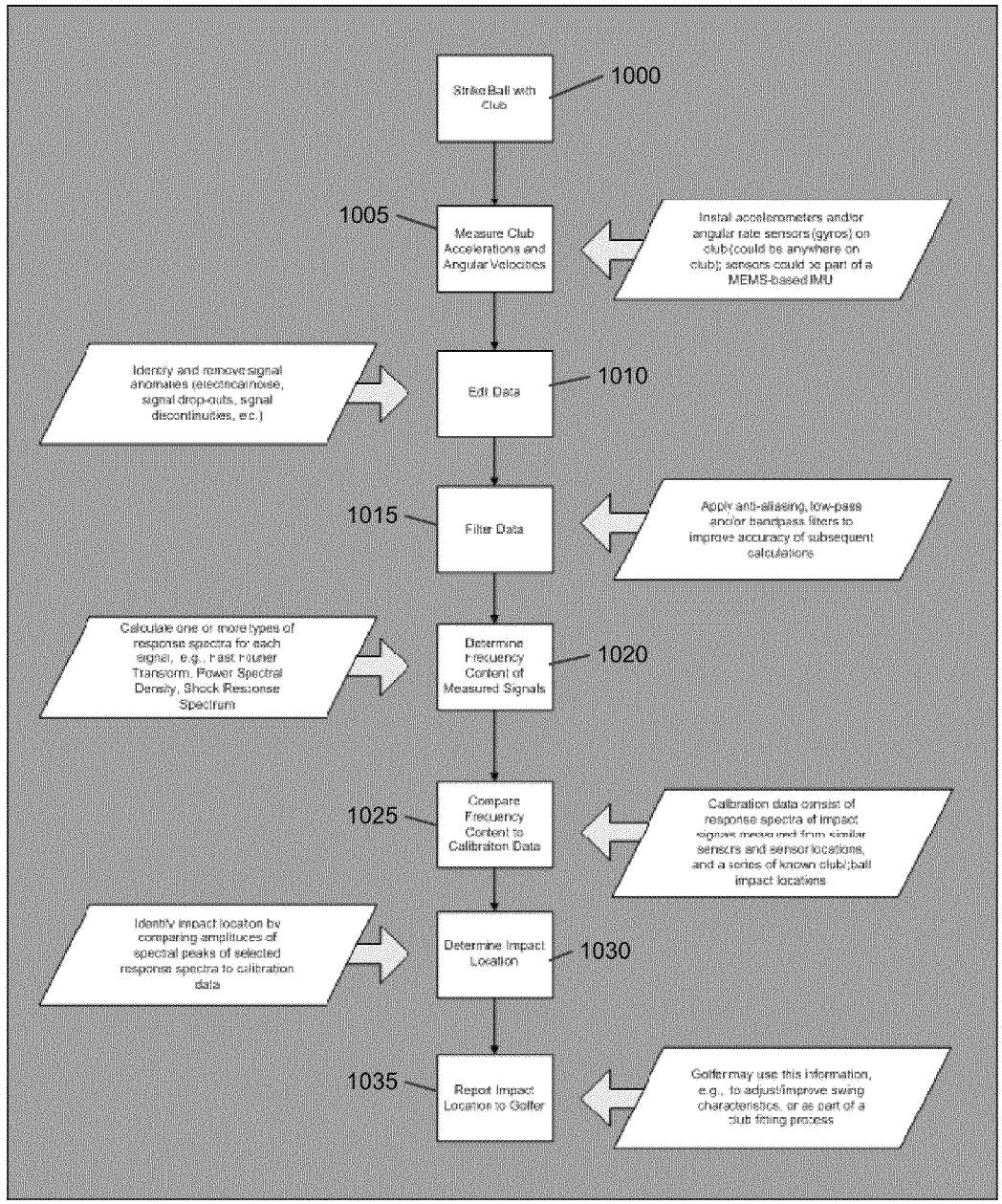
FIG. 10 illustrates an example golf club head according to one or more aspects described herein.

FIG. 10 illustrates an example method by which motion sensor data is used to calculate an impact location of a golf ball on a club face. In step 1000, a computing system may prompt a user to strike a golf ball with a golf club and the user may carry out the strike. As noted previously, the golf club with which the golf ball is struck may include one or more sensors including accelerometers and/or gyroscopes. In step 1005, the clubs accelerations and angular velocities may be determined from the sensors. In one example, the sensor data may be transmitted wirelessly from the club to the computing system. The computing system may be, in some arrangements, a user's mobile communication device such as a smartphone.

In step 1010, the sensor data may be edited to remove signal anomalies such as electrical noise, signal drop-outs, signal discontinuities and the like. Additionally, in step 1015, the sensor data may be filtered to apply anti-aliasing, low-pass and/or band-pass filters. The application of anti-aliasing and/or the low-pass or band-pass filters may help to improve the accuracy of subsequent calculations by restricting the bandwidth of the signal to a specified range. Subsequently, in step 1020, the computing system may determine the response spectra for each of the signals. The response spectra may include a set of frequencies included in each of the sensor signals. Determining the response spectra may be performed in a variety of manners and using various techniques such as FFT, Power Spectral Density and Shock Response Spectrum. FFT, as described above, is configured to separate a signal into its components frequencies with varying amplitudes. Power Spectral Density, on the other hand, may also decompose a signal into component frequencies using a stochastic process. Shock Response Spectrum provides a graphical or visual representation of a transient acceleration input (e.g., a shock or impact signal), in terms of a single degree of freedom system. Using any of these methods, the frequencies of a signal may be plotted against the amplitudes of the frequencies.

In step 1025, the response spectra may be compared to reference spectra. In one example, the reference spectra may correspond to empirically determined signal data based on a population of sample shots and manually identifying the location of impact. The population of sample shots may be analyzed similarly to steps 1000-1020 and the response spectra plotted against the location of impact. A correlation (e.g., similarities) between the response spectra for any given impact location may be extracted from the plot or comparison and used as reference or calibration factors. For example, in step 1030, the computing system may identify the impact location based on comparing the amplitudes of spectra peaks of selected response spectra with the reference data. Some frequencies or sensor readings may be more indicative of a particular impact location than other frequencies or sensor readings. Accordingly, the amplitudes of these frequencies may be compared to the reference frequencies to determine whether the response spectra is representative of the corresponding impact location. Depending on the impact location, some sensor data may be more indicative than other sensor data and as such, not all sensor data may be used to determine impact location at all times. For example, a response spectrum of the x-axis gyroscope may be more indicative of an impact location in along the z-axis than the y-axis gyroscope data. Similarly, a response spectrum of the z-axis may be more indicative of an impact location along the x-axis than the y-axis gyroscope data. Accordingly, if the amplitude of a specified frequency on the x-axis registers above a certain threshold, the y-axis data might not be evaluated. Other arrangements for using or not considering sensor data may be used to increase the efficiency of the analysis. Impact locations may be grouped into a predefined number of locations on a club face (see, e.g., FIG. 7). The number of discernible impact locations may depend on the granularity of the reference data and the sensitivity of the sensors used to detect the various accelerations and angular velocities.

Once the impact location has been identified, the computing system may report the impact location to the user in step 1035. In one example, the impact location report may be visual as shown in FIG. 8. Alternatively or additionally, the impact location output may include audio, textual or haptic information. In further arrangements, the impact location may be determined using both sound and motion sensor data. The impact locations determined using one method may be used to confirm and/or refine the determination using the other method.

Figure 11A:
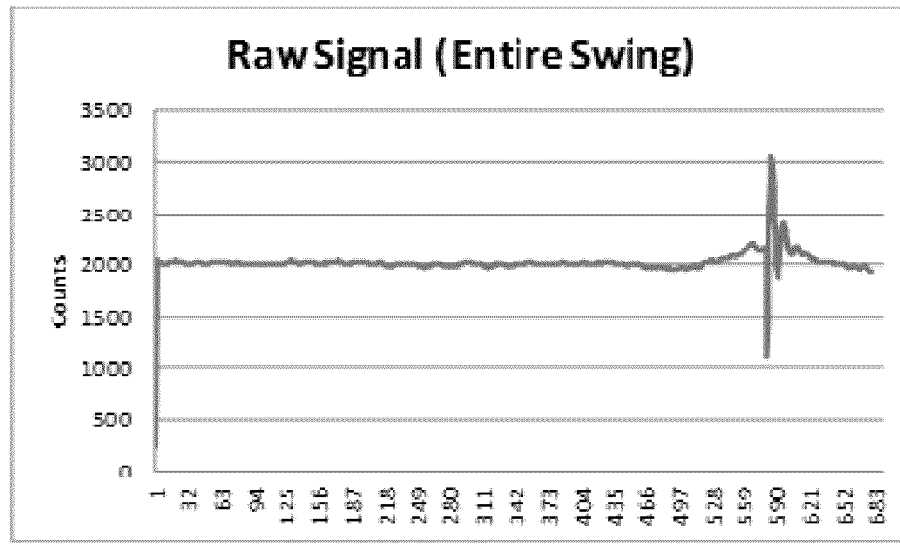
FIGS. 11A-11D illustrates example sound signals and reference frequencies according to one or more aspects described herein.
Figure 11B:
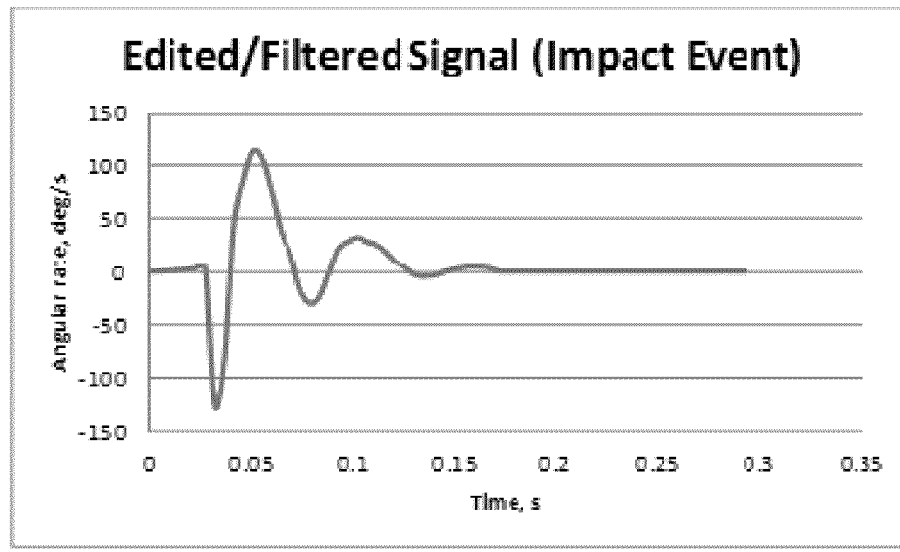
Figure 11C:
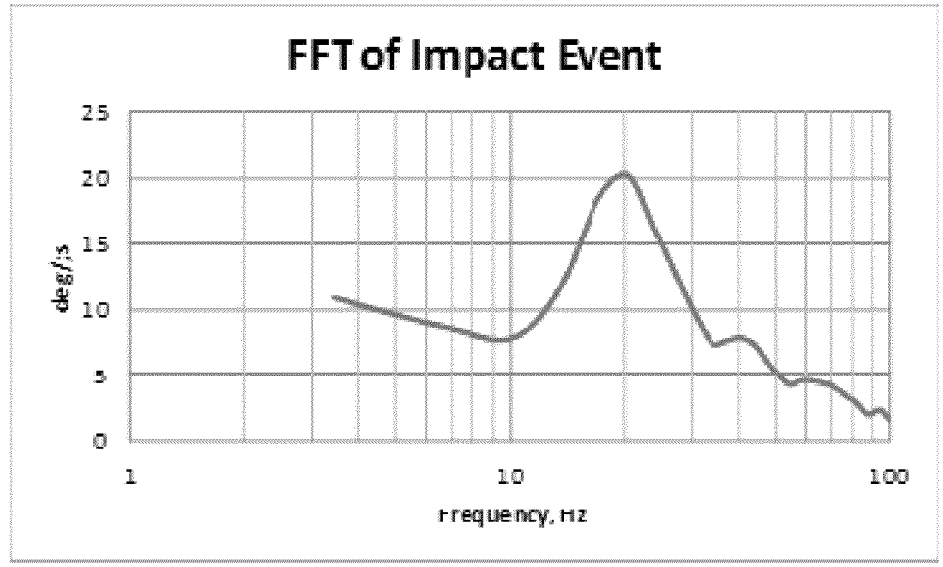

FIGS. 11A, 11B, 11C and 11D illustrate example sensor signals that may be used to determine the impact location. FIG. 11A, for instance, illustrates a raw gyroscopic sensor signal for one of the axes shown in FIG. 9. The sensor signal may include a significant amount of noise or irrelevant data up until approximately time point 500. Accordingly, during the editing and filtering process of steps 1010 and 1015, the raw sensor signal may be reduced to an edited and filtered signal as shown in FIG. 11B. The signal may further be converted into a frequency series through application of an FFT. The resulting sensor graph is shown in FIG. 11C.

Figure 11D:
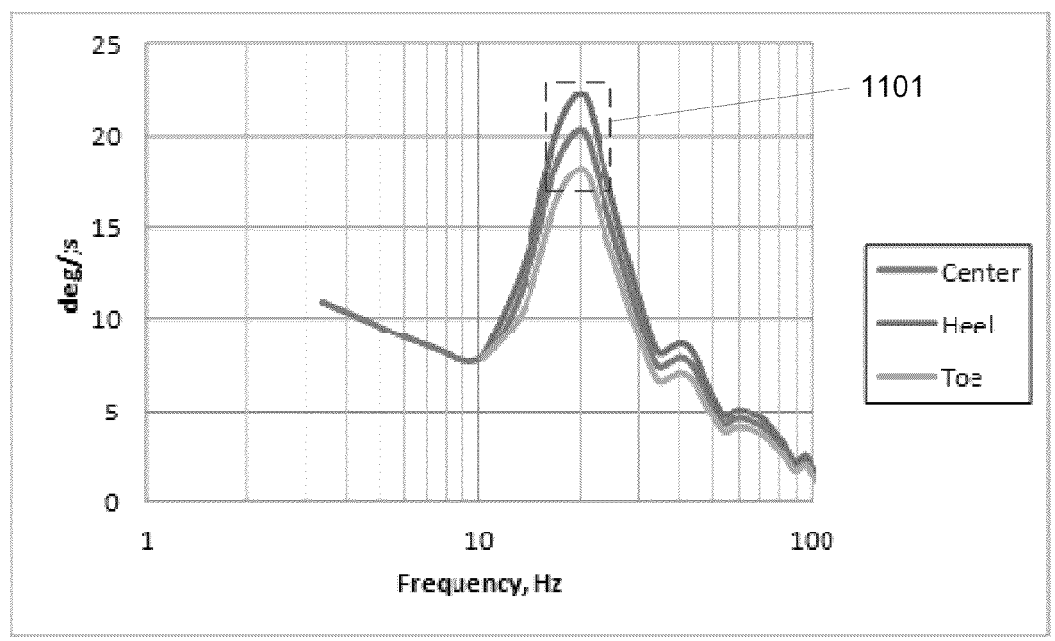

The frequency graph of the impact event of FIG. 11C may then be compared to reference graphs or spectra as shown in FIG. 11D. The top spectra represents a heel shot, the middle spectra represents a central shot and the bottom spectra represents a toe shot. In some examples, the comparison may include a determination of how closely the signal/spectra of FIG. 11C matches one or more of the spectra of FIG. 11D. A threshold level of match may be required before identifying the impact signal as corresponding to a particular impact location. In other examples, the computing system might only compare certain portions of the graph such as the frequency peak 1101. If those potions match within a threshold level of similarity, the computing system may determine that the sensor signal is representative of the corresponding impact location. Multiple portions of the response spectra may be evaluated and is not limited to the peak frequency. Additional response spectra may be defined for various other impact locations including a top-heel shot, a bottom-heel shot, a central-heel shot, a top-central shot, a bottom-central shot and a central-central shot and the like. Accordingly, depending on the granularity of the data and the ability to distinguish between portions of the response spectra between the various impact locations, more or fewer impact locations may be recognizable.

As discussed, the response spectra may differ between types and models of clubs and/or the type of golf ball being struck. Accordingly, in some arrangements, the reference spectra may be selected based on the type and/or model of club and/or ball being used. Using the various methods and systems described herein (e.g., club head speed determination using sound, impact location determination using sound or motion, etc.), a system may determine both impact location as well as golf club head speed using reference data for different combinations of golf club type and golf ball type.

4. Golf Ball Quality/Compression Determination Using Sound Analysis

The impact between a golf ball and a striking surface may also be indicative of an amount of compression the golf ball is configured to provide. The level of compressibility of a golf ball is directly related to the amount of energy that is released to propel the golf ball across the golf range. Accordingly, the performance and construction of golf balls may be checked to insure consistency. Additionally, manufacturers may perform quality checks on their products to insure that the level of compression is within desired and/or acceptable limits. For example, different golf ball products may be designed to have different levels of compression when hit, and thus, consumers may expect differing performance characteristics between the varying products.

Figure 12:
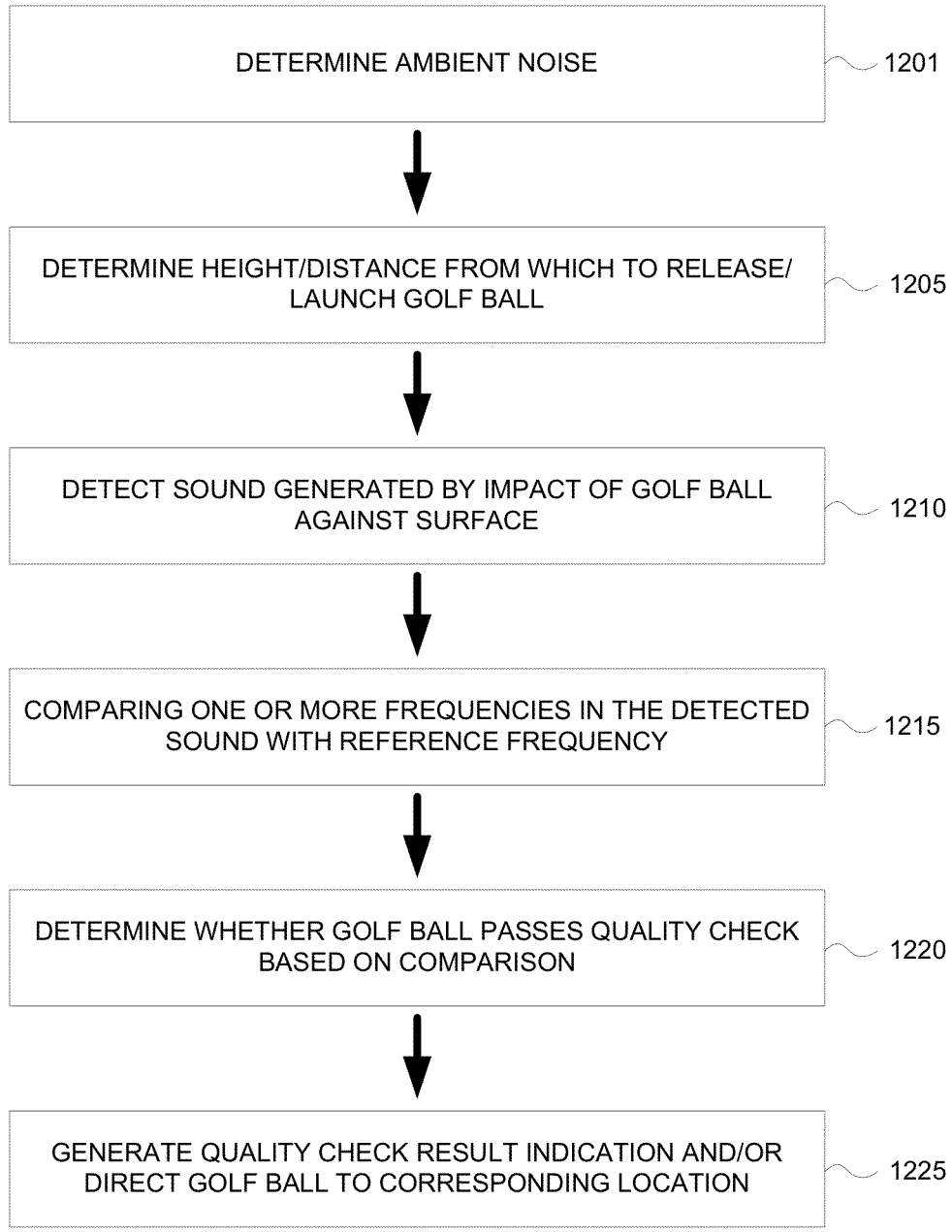
FIG. 12 illustrates an example process for testing golf balls using sound analysis according to one or more aspects described herein.

FIG. 12 illustrates an example method whereby ball compression may be verified and quality control may be enforced. In step 1201, a computing system may determine an amount of ambient noise in the testing facility. The ambient noise may affect the testing parameters including a distance from an impact surface that a golf ball is launched/released/dropped. For example, in order to distinguish a golf ball impact from ambient noise, the golf ball may be released from a sufficient distance such that the intensity of the impact is greater than the ambient noise. Accordingly, in step 1205, the computing system may determine the height from which to drop each golf ball. The determination may be made based on a predefined correlation between height and an expected intensity (e.g., volume) of the resulting impact. A different correlation may be defined for different types of balls. Thus, the predefined correlation (e.g., a table) may be selected further based on the type of ball being tested/evaluated.

In step 1210, the golf ball may be released or launched and the resulting impact sound may be recorded by the computing system. Once the sound is recorded, the sound signal may be processed to extract the component frequencies, as discussed herein. The computing system may then determine a reference frequency or reference frequencies with which to evaluate the recorded sound and component frequencies thereof. The reference frequency may be selected based on the height from which the ball was released as well as the type of golf ball. In one example, the amplitude of one or more reference frequencies may be compared with the amplitude of the corresponding one or more frequencies of the impact signal. If the amplitudes are determined to match (e.g., within a % or amount of difference of the reference frequency), then the computing system may determine that the golf ball is within the desired operational parameters (e.g., as shown in step 1220). Otherwise, the frequency characteristics may be identified as a non-match and the golf ball may be identified as failing the quality check.

In addition or as an alternative to frequency amplitude, the computing system may evaluate the signal for frequency peaks. For example, a frequency peak may correspond to a frequency at which the signal registered the greatest amplitude. Thus, if the frequency peak is registered at a first frequency, the computing system may determine that the golf ball experienced a first level of compression. Alternative, if the frequency peak registers at a second frequency, the computing system may determine that the golf ball experienced a second level of compression. Still further, the computing system may base its determination of one or more golf equipment characteristics on a detected frequency or amplitude shift in the signal (audio, motion sensor, etc.). For example, a 40 Hz shift in the peak frequency may correspond to a 0.3 mm increase or decrease in compression. In another example, a decibel shift may correspond to a specified amount of increase or decrease in compression. The shifts may also correspond to a shift in location of the impact location, in some arrangements. Accordingly, if the a first impact location or first level of compression is known or otherwise determined, a subsequent impact location or level of compression may be determined by adjusting the first impact location or level of compression based on an amount corresponding to the shift in frequency or amplitude.

In step 1225, the computing system may further generate an output such as a quality indication sound or visual indicator. In one example, the output may include a textual message specifying that the quality is confirmed. In another example, the output may comprise a display of a particular color (e.g., GREEN for quality confirmed and RED for golf balls that did not pass the quality check). In yet other examples, a sound may be played when a golf ball has not passed a quality check while no sound may be played when the golf ball passes the quality check.

Figure 13:
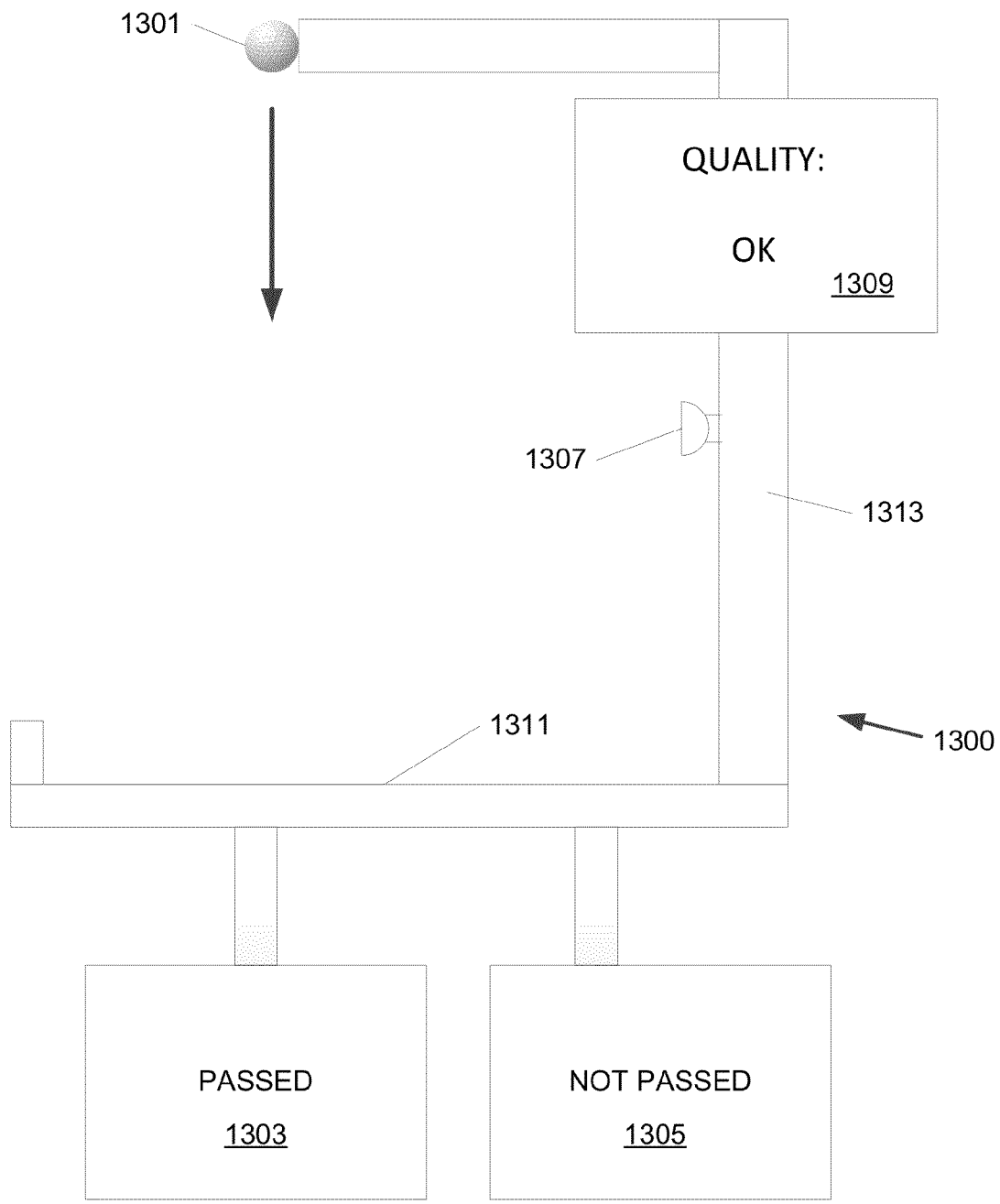
FIG. 13 illustrates an example apparatus configured to determine golf ball quality and to sort golf balls based on the determined quality according to one or more aspects described herein.

FIG. 13 illustrates an example ball testing and sort device 1300 configured to quality check each golf ball 1301 and to sort the golf balls, e.g., golf ball 1301 into one of the Passed storage 1303 and the Not Passaged storage 1305. For example, a sorting arm may be configured to move the golf ball 1301 (after it has been dropped) to one of multiple openings leading to each of the storages 1303 and 1305. The golf ball 1301 may be held by a set of claws (not shown) or other securing mechanism at a top of the device 1300. The golf ball 1301 may then be released toward surface 1311. The impact between the ball 1301 and surface 1311 may be recorded using microphone 1307. The result of ball 1301's quality check may be conveyed on display 1309. Alternatively or additionally, the quality check results may be provided through audio or haptic methods. The golf ball 1301 may be suspended above surface 1311 at a specified distance. Neck portion 1313 of device 1300 may be expandable and retractable such that the height of the ball may be modified. As noted above, if the ambient noise is too great, the height of the ball may be increased.

As described herein, the impact between a golf ball and another surface such as a golf club face or other type of impact surface may be indicative of a variety of golf equipment information including impact location, compression level and club head speed. The characteristics may be calculated using a computing device based on sensor data, including motion sensor data and/or sound data. Other types of equipment information may be derived from such sensor data and is not limited to the data output described herein.

Reference data for determining impact location, golf club head speed, golf ball compression or quality and other golf equipment characteristics may be predefined through user input or a population of test results and/or created on-the-fly through detection of actual user shots. In one example, for one or more shots, the user may have the option to input the type of club used, the type of ball hit and the impact location, golf club head speed, compression level or other golf equipment characteristic. Other factors that may be specified may include type of terrain, weather and geographic location. These shots may be test shots, shots taken at a driving range, shots taken during a golf game and the like and/or combinations thereof. The manually specified information may then be used to build a database (e.g., stored in association with one another) and to generate reference information/characteristics (e.g., impact location, golf club head speed, compression level, etc.) for a particular combination of equipment. Accordingly, a computing system may be configured to self-learn reference information to build such a database over time. Shot information from a plurality of users may also be combined to formulate a set of reference characteristics. For example, the user-specified golf equipment characteristics and attributes (e.g., type of equipment) may be transmitted to a tracking server for adding to a reference database. Alternatively or additionally, a reference database might only be built specifically for each individual user. For example, the reference data for one user might not be used for another user.

In some arrangements and according to aspects described herein, reference data may include sound signatures for different ball and club combinations. For example, for a given golf ball type and golf club type combination, the sound generated from an impact at a particular point on the club head face may have the same or substantially the same sound signal or signal shape irrespective of the club head speed. However, the club head speed may affect the volume/intensity of the sound and thus, may be reflected in the amplitude of the signal, while the overall signal shape may remain consistent or unchanged. Impact the golf ball with different locations on the golf club face, on the other hand, may alter the expected signal shape. Accordingly, each impact location for a given golf ball type and golf club type combination may be associated with a different reference signal shape.

Using such sound signatures, an impact between a given golf ball and golf club head may be compared against a library or database of sound signatures for hits using that golf ball and golf club head combination. In one example, Fast Fourier Transform analysis may be applied. Because the overall shapes of the sound signals may differ depending on the location on the face where the club head and ball meet, the best match for the general shape of the unknown contact sound signal (e.g., the collision being analyzed) may be identified from a library subset of known impact locations for that club/ball (using the Fast Fourier Transform analysis). The match may represent the position on the face where the ball and club head collided. Furthermore, by looking at the amplitudes of the signals generated for both the unknown signal (e.g., the signal/hit being analyzed) and the known reference signal at the impact location, a system may also determine and/or provide an estimation of the club head speed during the unknown contact. For example, the club head speed may be determined (e.g., estimated) by looking at the amplitudes of one or more of the sound signature peak(s) for the unknown contact and comparing that amplitude(s) with the stored amplitude(s) at the known speeds (optionally also using extrapolation and interpolation for amplitudes outside of the known reference points).

As described, sound and motion sensor signals may be indicative of impact location, golf ball compression and golf club head speed. Such signals may also provide information and be used to determine other golf equipment characteristics including material hardness, whether golf equipment (e.g., golf club) material has delaminated from each other, whether layers in the equipment include voids or pores, and/or difference in hardness of layers. Layers may refer to layers in any of golf equipment including a golf club head and a golf ball. For example, a golf ball may be tested for quality and/or consistency prior to complete construction (e.g., a golf ball precursor). In a particular example, a golf ball inner core and a first layer (e.g., a mantle) may be tested for consistency or quality, prior to attaching or forming the outer layer.

Still further, the various equipment and/or performance characteristics such as swing speed (e.g., club head speed), impact location and the like may be used to determine the quality of a user's shot. For example, if the user hits a golf ball with a central area of the golf club head (e.g., the "sweet spot"), a computing device may advise the user that he or she has made an excellent or high quality shot (e.g., good hit). Additionally, the farther away from the central area (or other predefined area), the lower the quality of shot (e.g., an OK hit, a decent hit, a bad hit). The equipment and/or performance characteristics may be combined to determine the quality of the shot. For example, a highest quality shot may be defined by a high club head speed and impacting a predefined (e.g., central area) of the golf club head. Golf shot quality may be defined in a variety of manners including based on a rating scale of 1-10, a color rating scale (green for good, yellow for OK and red for bad).

CONCLUSION

While the invention has been described in detail in terms of specific examples including presently preferred modes of carrying out the invention, those skilled in the art will appreciate that there are numerous variations and permutations of the above described systems and methods. Thus, the spirit and scope of the invention should be construed broadly as set forth in the appended claims.

I claim:

1. A non-transitory computer readable medium storing instructions that, when executed, cause an apparatus to:
receive first sound data generated from an impact of a first golf ball with a golf club swung by a user;
receive second sound data generated from an impact of a second golf ball with the golf club swung by the user,
analyze the impact data to:
determine whether a predefined frequency is included in the first sound data;
determine whether the predefined frequency is included in the second sound data;
determine a head speed of the golf club based on whether an audio signal of the predefined frequency is included in the first sound data and the second sound data and generate an output specifying one or more characteristics of the impact.

2. The non-transitory computer readable medium of claim 1, wherein the first golf ball includes an inner core having a first size and the second golf ball includes an inner core having a second size, greater than the first size, wherein the inner cores of the first and second golf balls are configured to generate an audio signal having the predefined frequency.

3. The non-transitory computer readable medium of claim 1, wherein an inner core of the first golf ball is configured to generate the audio signal having the predefined frequency when struck by the golf club with a first predefined head speed, and
wherein an inner core of the second golf ball is configured to generate the audio signal having the predefined frequency when struck by the golf club with a second predefined head speed different from the first predefined head speed.

4. The non-transitory computer readable medium of claim 1, wherein generating the output includes:
determining a type of golf ball based on the determined head speed of the golf club; and
outputting a recommendation of the type of golf ball.

5. The non-transitory computer readable medium of claim 2, wherein analyzing each of the first sound data and the second sound data includes:
determining whether the predefined frequency has a threshold amplitude in the first sound data;
determining whether the predefined frequency has a threshold amplitude in the second sound data; and
determining a head speed of the golf club based on whether the predefined frequency has the threshold amplitude in the first sound data and the second sound data.

6. The non-transitory computer readable medium of claim 1, wherein the first and second golf balls include a rubber outer core and a resin inner core.

7. The non-transitory computer readable medium of claim 1, wherein the instructions, where executed, further cause the apparatus to: receive third sound data generated from an impact of a third golf ball with the golf club, and
wherein the third golf ball is differently constructed from the first and second golf balls.

8. The non-transitory computer readable medium of claim 1, wherein the output includes a recommendation of a type of golf ball for the user.

9. The non-transitory computer readable medium of claim 1, wherein the output includes a head speed of the golf club and an impact location between the golf ball and the golf club.

10. A method comprising:
receiving first sound data generated from an impact of a first golf ball with a golf club swung by a user;
receiving second sound data generated from an impact of a second golf ball with the golf club swung by the user,
analyzing the impact data to:
determine whether a predefined frequency is included in the first sound data;
determine whether the predefined frequency is included in the second sound data;
determine a head speed of the golf club based on whether an audio signal of the predefined frequency is included in the first sound data and the second sound data and generating an output specifying one or more characteristics of the impact,
wherein the first golf ball is differently constructed than the second golf ball.

11. The method of claim 10, wherein the output includes a head speed of the golf club and an impact location between the golf ball and the golf club.

12. The method of claim 10, wherein the first golf ball includes an inner core having a first size and the second golf ball includes an inner core having a second size, greater than the first size, wherein the inner cores of the first and second golf balls are configured to generate an audio signal having the predefined frequency.

13. The method of claim 10, wherein an inner core of the first golf ball is configured to generate the audio signal having the predefined frequency when struck by the golf club with a first predefined head speed, and
wherein an inner core of the second golf ball is configured to generate the audio signal having the predefined frequency when struck by the golf club with a second predefined head speed different from the first predefined head speed.

14. The method of claim 10, wherein generating the output includes:
determining a type of golf ball based on the determined head speed of the golf club; and
outputting a recommendation of the type of golf ball.

15. The method of claim 12, wherein analyzing each of the first sound data and the second sound data includes:
determining whether the predefined frequency has a threshold amplitude in the first sound data;
determining whether the predefined frequency has a threshold amplitude in the second sound data; and
determining a head speed of the golf club based on whether the predefined frequency has the threshold amplitude in the first sound data and the second sound data.

16. The method of claim 10, wherein the first and second golf balls include a rubber outer core and a resin inner core.

17. The method of claim 10, further comprising: receiving third sound data generated from an impact of a third golf ball with the golf club, and
wherein the third golf ball is differently constructed from the first and second golf balls.

18. A method comprising:
receiving first sound data generated from an impact of a first golf ball against a face of a golf club, wherein the data includes an audio signal;
receiving second sound data generated from an impact of a second golf ball against the face of the golf club, wherein the first golf ball is differently constructed than the second golf ball;

analyzing each of the first sound data and the second sound data to determine whether a specified frequency is included in each of the first sound data and the second sound data; and generating an output based on the analysis of the first sound data and second sound data, the output including a determined golf club head speed.

19. The method of claim 18, further comprising generating a recommendation for a type of golf ball based on the determined golf club head speed.

20. The method of claim 18, wherein the first golf ball includes an inner core having a first size and the second golf ball includes an inner core having a second size, greater than the first size, wherein the inner cores of the first and second golf balls are configured to generate an audio signal having a predefined frequency.

21. The method of claim 20, wherein the head speed of the golf club is determined based on whether the audio signal of the specified frequency is included in the first sound data and the second sound data.

* * * * *